United States Patent
Chen et al.

(10) Patent No.: US 8,720,778 B2
(45) Date of Patent: May 13, 2014

(54) SYSTEM, METHOD, AND STORAGE UNIT FOR MANAGING MULTIPLE OBJECTS IN AN OBJECT ZONE

(71) Applicant: Toshiba Global Commerce Solutions Holdings Corporation, Tokyo (JP)

(72) Inventors: Pamela Chen, Taipei (TW); Rebecca L J Chen, Taipei (TW); Chun-Lin Liao, Taipei (TW)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 13/905,467

(22) Filed: May 30, 2013

(65) Prior Publication Data
US 2013/0320085 A1 Dec. 5, 2013

(30) Foreign Application Priority Data
May 31, 2012 (TW) .............................. 101119592 A

(51) Int. Cl.
*G06F 19/00* (2011.01)
*G06Q 30/00* (2012.01)
*G06Q 90/00* (2006.01)

(52) U.S. Cl.
USPC .............................. 235/385; 235/375; 235/487

(58) Field of Classification Search
USPC .................................. 235/385, 383, 487, 375
See application file for complete search history.

(56) References Cited

U.S. PATENT DOCUMENTS

| | | | |
|---|---|---|---|
| 7,828,211 B2 * | 11/2010 | Landers et al. | 235/385 |
| 2005/0230472 A1 * | 10/2005 | Chang | 235/383 |
| 2007/0159298 A1 * | 7/2007 | Zegelin et al. | 340/5.91 |
| 2009/0138303 A1 * | 5/2009 | Seshadri | 705/7 |
| 2010/0223147 A1 * | 9/2010 | Oishi | 705/23 |

* cited by examiner

Primary Examiner — Edwyn Labaze
(74) Attorney, Agent, or Firm — Olive Law Group PLLC

(57) ABSTRACT

Disclosed is a system for managing multiple objects in an object zone. The system comprises multiple machine-readable object identification tags configured to be respectively attached to the multiple objects; a storage unit moving through the object zone to store the selected objects which are respectively attached with the machine-readable object identification tags; at least one machine-readable storage unit identification tag attached to the storage unit; and multiple spaced reading units capable of remotely reading the multiple machine-readable object identification tags and the at least one machine-readable storage unit identification tag, wherein the objects attached with the machine-readable object identification tags within a predefined spatial range defined based on the at least one machine-readable storage unit identification tag are associated with the storage unit. A method thereof and a storage unit are also disclosed.

12 Claims, 7 Drawing Sheets

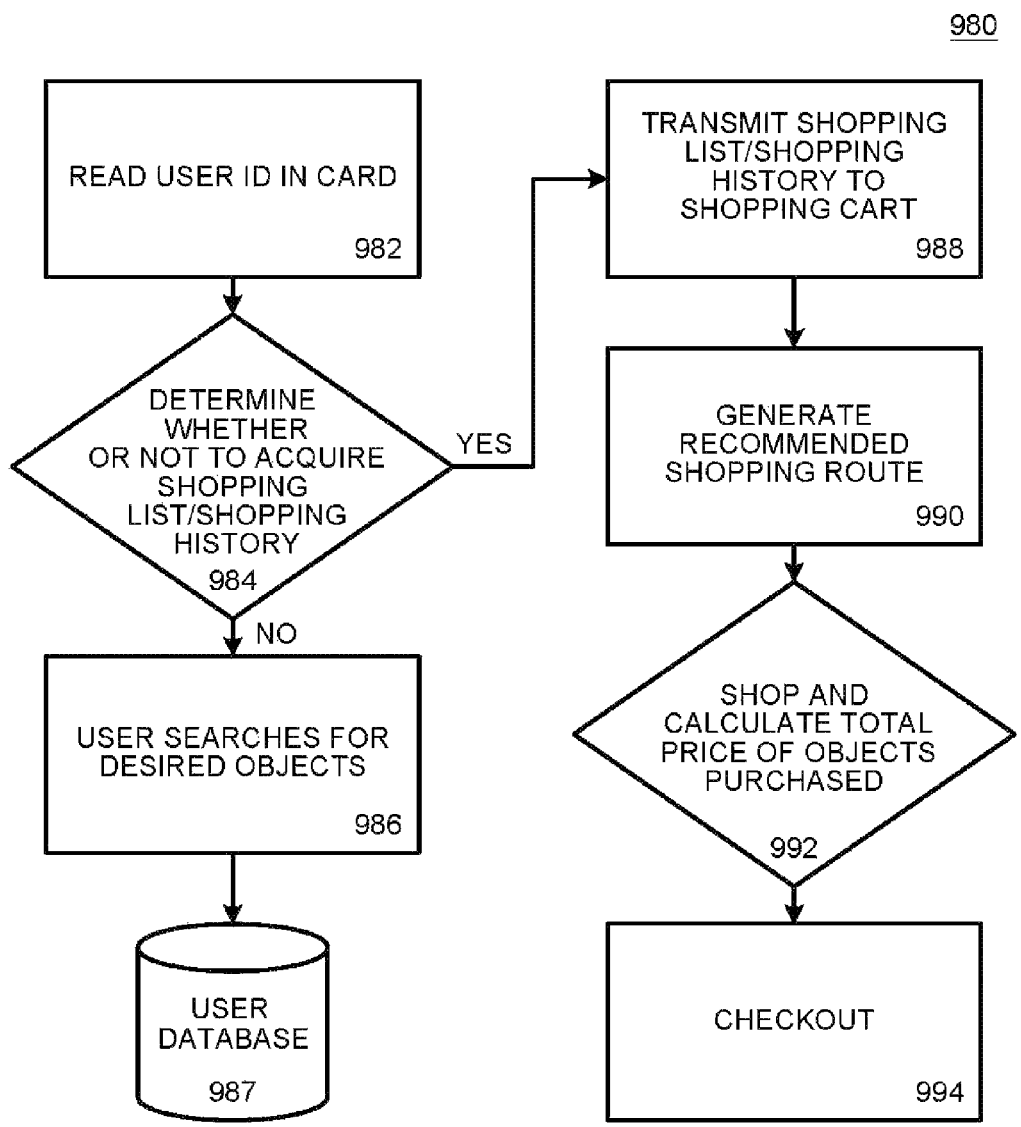

SYSTEM, METHOD, AND STORAGE UNIT FOR MANAGING MULTIPLE OBJECTS IN AN OBJECT ZONE

CROSS REFERENCE TO RELATED APPLICATION

This application claims the benefit of Taiwan Patent Application No. 101119592, filed May 31, 2012, the content of which is hereby incorporated herein by reference in its entirety.

TECHNICAL FIELD

Embodiments described herein relate to a technology for managing the objects selected by a user in a location, and more specifically to a system and a method for managing the objects in a storage unit in a location and the storage unit thereof.

BACKGROUND

Conventionally, in a marketplace (e.g. convenience store, chain supermarket, department store, variety store, shopping mall, etc.), a checkout is realized at a checkout counter through the manual input of an amount or by inputting the commodities purchased through an infrared code scanning.

The way the infrared code scanning reduces the expenses of the marketplace as well as provides convenient service for the customer to save checkout time for the customer. However, this technology, as is required to scan objects one by one, is still time-consuming.

Radio Frequency Identification (RFID), one of the mainstream technologies used in recent years, consists mainly of a RFID tag (also called radio frequency identification tag) and a reader. The RFID tag may be placed on each object and contains specific information of the object such as price, identifier, expiration date and serial number. By placing an RFID tag on each object, a batch or cart of objects can be wholly scanned one time, which shortens the time spent on object reading when compared with the scanning on each object one by one.

As stated above, RFID technology can read, through wireless communication, multiple objects automatically in a non-contact manner, without the aid of any manpower, thus quickening the checkout speed of a marketplace significantly. In application, an RFID tag may be set on a commodity, and a reader may be mounted on a shopping cart so that the commodity in the shopping cart and the total price of the commodities can be read by the reader, or an RFID gate system is configured in a marketplace to read a shopping cart immediately the shopping cart passes the RFID gate system.

SUMMARY

Disclosed herein are systems, methods and storage units for managing multiple objects in an object zone. According to an aspect, a system may include multiple machine-readable object identification tags configured to be respectively attached to the multiple objects. The system may also include a storage unit moving through the object zone to store the selected objects. Further, the system may include one or more machine-readable storage units identification tag configured to be attached to the storage unit. The system may include multiple spaced reading units capable of remotely reading the multiple machine-readable object identification tags and the at least one machine-readable storage unit identification tag. The objects attached with the machine-readable object identification tags may be within a predefined spatial range based on the machine-readable storage unit(s) identification tag are associated with the storage unit.

According to another aspect, a storage unit applicable to an object zone in which there are multiple objects which are respectively attached with multiple machine-readable object identification tags is disclosed. The storage unit may move through the object zone to store the selected objects. The storage unit may include a storage unit body. Further, the storage unit may include one or more machine-readable storage unit identification tags which are attached to the storage unit body. The multiple spaced reading units are configured in the object zone to remotely read the multiple machine-readable object identification tags and the machine-readable storage unit identification tag(s). The objects attached with the machine-readable object identification tags within a predefined spatial range defined based on the at least one machine-readable storage unit identification tag are associated with the storage unit.

According to an aspect, a method for managing multiple objects in an object zone includes attaching multiple machine-readable object identification tags to the multiple objects respectively. The method may include attaching at least one machine-readable storage unit identification tag to a storage unit which moves through the object zone to store the selected objects. Further, the method may include remotely reading the multiple machine-readable object identification tags and the at least one machine-readable storage unit identification tag using multiple spaced reading units. The objects may be attached with the machine-readable object identification tags within a predefined spatial range defined based on the machine-readable storage unit identification tag(s) are associated with the storage unit.

BRIEF DESCRIPTION OF THE DRAWINGS

FIG. 7 is a flowchart illustrating the shopping and checkout flow in a marketplace of the embodiment.

DETAILED DESCRIPTION

In accordance with an embodiment, a system for managing multiple objects in an object zone, comprises multiple machine-readable object identification tags configured to be respectively attached to the multiple objects, a storage unit moving through the object zone to store the selected objects, at least one machine-readable storage unit identification tag configured to be attached to the storage unit and multiple spaced reading units capable of remotely reading the multiple machine-readable object identification tags and the at least one machine-readable storage unit identification tag, wherein the objects attached with the machine-readable object identification tags being within a predefined spatial range based on the at least one machine-readable storage unit identification tag are associated with the storage unit.

In accordance with another embodiment, a storage unit applicable to an object zone in which there are multiple objects which are respectively attached with multiple machine-readable object identification tags, wherein the storage unit moving through the object zone to store the selected objects, the storage unit comprises a storage unit body; and at least one machine-readable storage unit identification tag which is attached to the storage unit body, wherein multiple spaced reading units are configured in the object zone to remotely read the multiple machine-readable object identification tags and the at least one machine-readable storage unit identification tag, and the objects attached with the machine-readable object identification tags within a predefined spatial range defined based on the at least one machine-readable storage unit identification tag are associated with the storage unit.

In accordance with another embodiment, a method for managing multiple objects in an object zone, comprises attaching multiple machine-readable object identification tags to the multiple objects respectively, attaching at least one machine-readable storage unit identification tag to a storage unit which moves through the object zone to store the selected objects and remotely reading the multiple machine-readable object identification tags and the at least one machine-readable storage unit identification tag using multiple spaced reading units, wherein the objects attached with the machine-readable object identification tags within a predefined spatial range defined based on the at least one machine-readable storage unit identification tag are associated with the storage unit.

Figure 1:
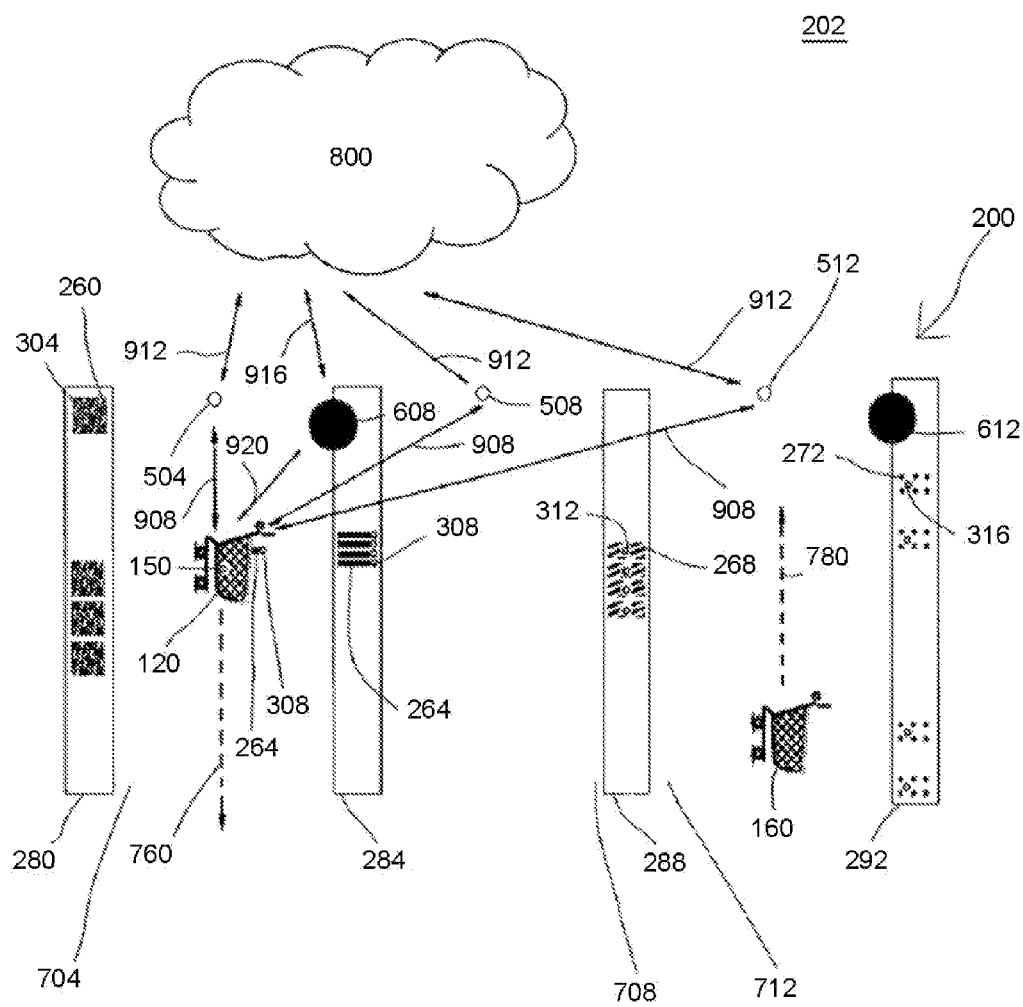
FIG. 1 is a system for identifying and managing the objects placed in a storage unit in an object zone of one embodiment.

FIG. 1 is a block diagram illustrating an identification/management system 200 for identifying/managing the objects placed in a storage unit 120 or 160 in an object zone 202 (for example, but is not limited to a shopping cart, a goods shelf, a counter, a pallet, a box, a cage and a storage unit having a proper storage space, etc.) or in a location according to a first specific embodiment. The system 200 can be applied to various locations or object zones (for example, but are not limited to marketplace, shopping mall, store, supermarket, other shopping places or environments, or warehouse, freight station, other goods storage places or environments, etc.).

Take FIG. 1 as an example, the system 200 may be applied to a marketplace 202 in which a variety of kinds of objects 260, 264, 268 and 272 (for example, but are not limited to objects and stocks, etc) are displayed. The objects 260, 264, 268 and 272 are remotely tracked and managed using machine-readable identification tags 304, 308, 312 and 316 which may be, for example, RFID tags, zigbee tags, NFC tags and the like. Take RFID tags as an example, RFID tags 304, 308, 312 and 316 may be attached to the objects 260, 264, 268 and 272 or associated with the objects 260, 264, 268 and 272 in other ways. Object-related information, for example, identification name, manufacturer, suggested price and serial number, may be stored in the RFID tags 304, 308, 312 and 316.

Object zone blocks 280, 284, 288 and 292, which may be, for example, object counters, object shelves, objects, stock counters, stock shelves and/or stock piles, are set in the object zone 202 or in a location. Take object shelves as an example, the spaces between each object shelve 280, 284, 288 and 292 form aisles 704, 708 and 712 for the user pushing a shopping cart 120/160 to pass through it. Multiple reading units 504, 508 and 512 are arranged in the marketplace 202 to remotely track and determine positions of the machine-readable identification tags 304, 308, 312 and 316 in the marketplace 202. The reading unit 504, 508 or 512 may be any device that can remotely track and determine the positions of machine-readable identification tags 304, 308, 312 and 316, but is not limited to a reader, a RFID reader, an active wireless radio frequency identification tag or a semi-passive wireless radio frequency identification tag. The aforementioned reading unit is a well-known technology which can be easily purchased from the market; therefore, the internal running of the reading unit is not described herein so as not to obscure the point of embodiments of the present invention.

In a specific embodiment, the multiple reading units may be, for example, RFID readers, the number of which is at least equal to 3. If there are three RFID readers 504, 508 and 512, the RFID readers are fixed at proper positions in the market 220 corresponding to shopping carts 120 and 160, for example, on the ceiling of the marketplace 220, above the object zone blocks 280, 284, 288 and 292, or on the walls of the marketplace 220, etc.

The system 200 further comprises wireless communication devices 608 and 612 and a computer infrastructure 800 for providing checkout, advertisement and personal services. In a specific embodiment, the computer infrastructure 800 provides services related to the object management of the marketplace 202, which include but are not limited to the recording of the information related to the RFID tag of an object, the management on checkout, the recording of after-sale service, the suggestion on the object to be purchased, the indication to objects nearby, the indication to promotions, and the recommendation for shopping routes in the marketplace. The wireless communication devices 608 and 612 providing wireless network access points may be, but are not limited to, Bluetooth devices, wireless local area network devices or the combinations thereof, which enable the communication between the components of the system 200. Structures, details and operations of the shopping carts 120 and 160, the wireless communication devices 608 and 612 and the computer infrastructure 800 will be described later in detail.

The system 200 may selectively comprise a user card 616 (refer to FIG. 2), which may be a member card, an employee identification card, a credit card, a charge card and a user ID card, etc. The user card 616 comprises a memory 620 for storing personal information and preferences of the user. The memory 620 may be an optical medium, a magnetic strip, a wafer and a RFID tag.

When passing through the aisles 704 and 708 along routes 760 and 780, the customer places the objects 260, 264, 268 and 272 in the shopping cart 120. As shown in FIG. 1, after the customer places the object 264 (and machine-readable identification tag 308) in the shopping cart 120, and if the object 264 located within the readable range of the RFID readers 504, 508 and 512, through the RFID readers 504, 508 and 512, the system 200 tracks the object 264 selected by the user from the object zones 280, 284, 288 and 292 and placed in the shopping cart 120, the detail and the action of the tracking will be described later.

Figure 2:
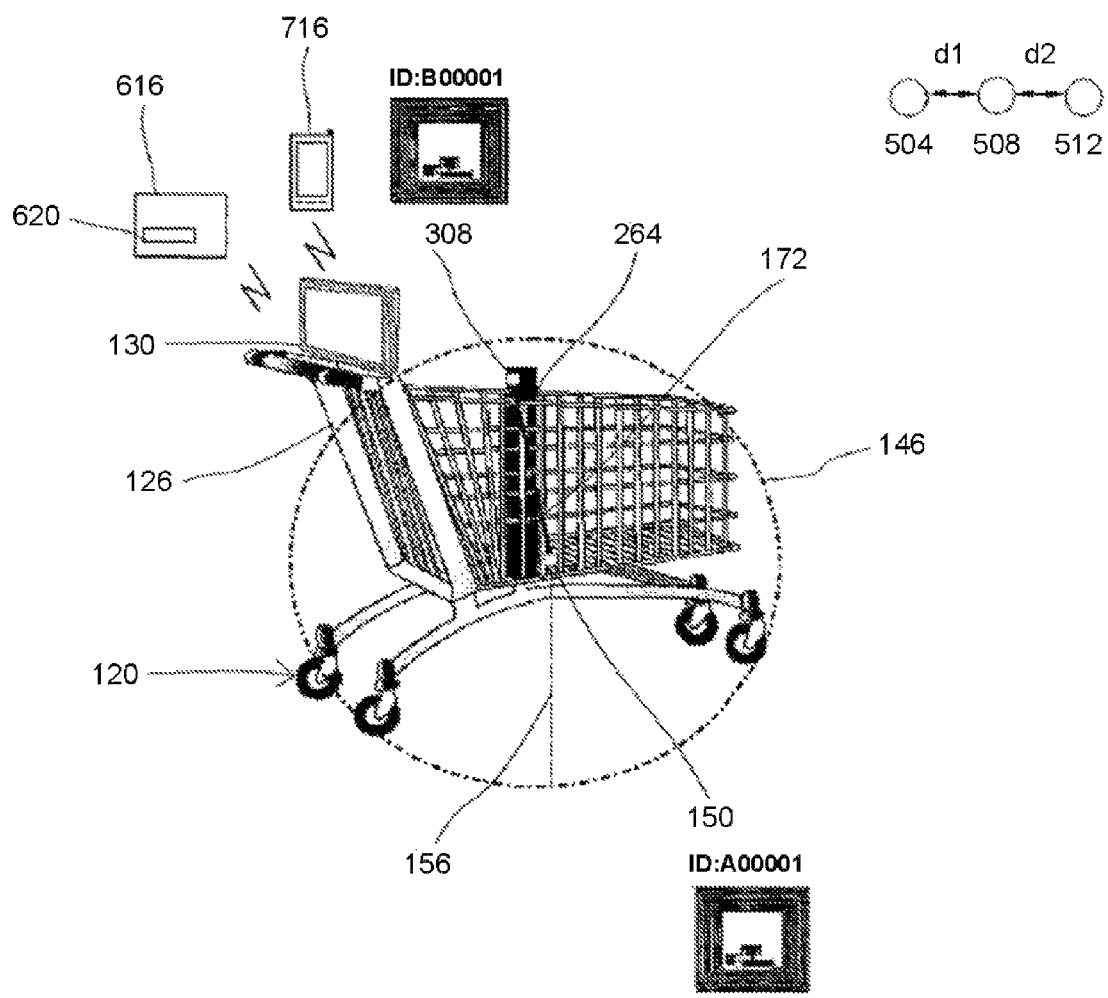
FIG. 2 is a schematic diagram illustrating a shopping cart of the embodiment.

FIG. 2 is a schematic diagram illustrating the shopping cart 120 according to a specific embodiment, refer synchronously to FIG. 1, the shopping cart 120 includes a shopping cart body 126 and a shopping cart matching device 130. The shopping cart 120 further comprises a machine-readable identification tag 150 which is located at the substantially central point of the shopping cart 120 to define, based on the machine-readable identification tag 150, a spherical space 146 having a radius 156 as a predefined spatial range. Through the aforementioned remote tracking, positions of the machine-readable identification tag 150 (ID: A00001) of the shopping cart 120 and the machine-readable identification tag 308 (ID: B00001) of the object 264 can be acquired. The object is related to the shopping cart 120 when the machine-readable identification tag 308 of the object 264 is within the range of the spherical space 146; in a specific embodiment, it is determined that the object 264 is accommodated in the shopping cart 120, in other words, it is deemed that the object 264 is selected and placed in the shopping cart 120 by the purchaser.

Figure 3:
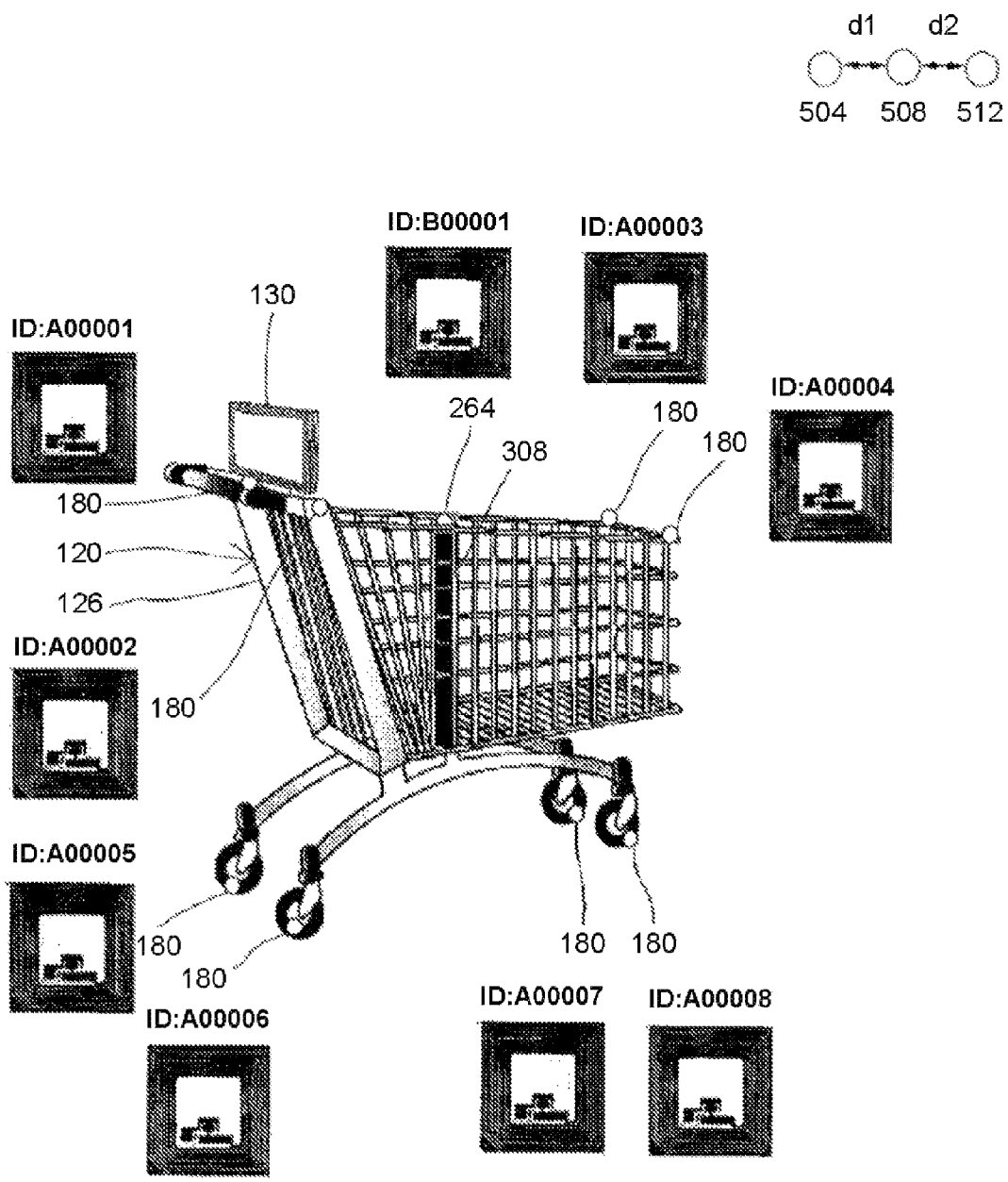
FIG. 3 is a schematic diagram illustrating a shopping cart of the embodiment.

FIG. 3 is a schematic diagram illustrating the shopping cart 120 according to a specific embodiment, the shopping cart 120 comprises a shopping cart body 126 and a shopping cart matching device 130. The shopping cart 120 further comprises at least two machine-readable identification tags 180 which are configured on the surface of the shopping cart 120 to define a predefined spatial range. In a specific embodiment, two machine-readable identification tags are configured on the shopping cart 120 and located at the two vertexes (for example, but are not limited to, the vertexes of the longest diagonal of a hexahedral shopping cart) on the external outline of the shopping cart 120 which are substantially furthest from each other so as to define a spatial range. On the other hand, as to the specific embodiment shown in FIG. 3, eight machine-readable identification tags 180 are configured on the vertexes of the external outline of the shopping cart 120 to define a spatial range.

Figure 4:
FIG. 4 is a schematic diagram exemplarily illustrating the spatial range defined by multiple machine-readable identification tags of the embodiment.

Continue the illustration of FIG. 3, FIG. 4 is a schematic diagram exemplarily illustrating the spatial range 178 substantially in the shape of a cuboid or hexahedron defined by eight machine-readable identification tags 180 in a specific embodiment, however, the aforementioned configuration/range is merely illustrative but is not to be construed as limiting the present invention. Refer to FIG. 1-FIG. 3, positions of the machine-readable identification tags 180 (ID: A00001; ID: A00002; ID: A00003; ID: A00004; ID: A00005; ID: A00006; ID: A00007; ID: A00008) of the shopping cart 120 and the machine-readable identification tag 308 (ID: B00001) of the object 264 are remotely tracked by RFID readers 504, 508 and 512, it is defined that the object is related to the shopping cart 120 when the machine-readable identification tag 308 of the object 264 is within the spatial range 178, for example, it is determined that the object 264 is accommodated in the shopping cart 120, in other words, it is deemed that the object 264 is selected and placed in the shopping cart 120 by the purchaser.

Generally, the tracking distance of a passive RFID tag is about 5-10 m. Certainly, the tracking distance can be increased if the antenna of the RFID tag is lengthened. On the other hand, the identification distance of a zigbee tag is 0-200 m. The RFID readers 504, 508 and 512 are arranged at intervals, for example, the interval between the RFID readers 504 and 508 is d1, and that between the RFID readers 508 and 512 is d2; the distance between the machine-readable identification tag 150 of the shopping cart 120 and the machine-readable identification tag 308 of the object 264 can be calculated using various positioning methods (for example, but are not limited to, trilateration positioning method). In view of cost reduction, it is considered to adopt a low-accuracy scheme. However, to obtain a higher accuracy, a relatively expensive high-accuracy positioning technology, in which, for example, at least 6 RFID readers are used, is needed.

Refer to FIG. 2 again, after the RFID readers 504, 508 and 512 acquires the position coordinate $(x_{c1}, y_{c1}, z_{c1})$ of the machine-readable identification tag 150 of the shopping cart 120 and the position coordinate $(x_{p1}, y_{p1}, z_{p1})$ of the machine-readable identification tag 308 of the shopping cart 120 in which the object 264 is placed, the distance 172 between the machine-readable identification tag 150 and the machine-readable identification tag 308 is calculated according to the following formula:

$$|\vec{r}_{c1p1}| = \sqrt{(x_{c1}-x_{p1})^2 + (y_{c1}-y_{p1})^2 + (z_{c1}-z_{p1})^2}.$$

If the distance 172 between the machine-readable identification tag 150 and the machine-readable identification tag 308 is smaller than the radius 156 of the spherical space 146, it is deemed that the object 264 is placed in the shopping cart 120, when the distance 172 is greater than the radius 156 of the spherical space 146, it is deemed that the object 264 is not placed in the shopping cart 120, however, the configuration/determination above is merely illustrative but is not to be construed as limiting the present invention.

Similarly, according to FIG. 3, whether or not the object 264 is in the shopping cart 120 can be determined after the RFID readers 504, 508 and 512 acquire the position coordinate of each machine-readable identification tag 180 (for example, two machine-readable identification tags 180 in the aforementioned specific embodiment and the eight machine-readable identification tags 180 in another specific embodiment) and the position coordinate of the machine-readable identification tag 308 of the object 264 in the shopping cart 120. In a specific embodiment, if the following formula is met: $\text{Max}\{|\vec{r}_{c1p1}|_2 |\vec{r}_{c2p1}|, \ldots, |\vec{r}_{c3p1}|\} < r_{criteria}$ ($r_{criteria}$: the distance between two furthest vertexes on the external outline of the shopping cart 120 attached with two machine-readable identification tags 180 in an embodiment, or the longest distance between two machine-readable identification tags 180 in an embodiment in which eight machine-readable identification tags 180 are configured), then the object is placed in the shopping cart 120, otherwise, the object 264 is not placed in the shopping cart 120, however, the configuration/determination above is merely illustrative but is not to be construed as limiting the present invention.

Refer to FIG. 1 again, when determining that the object 264 is placed in the shopping cart 120 by identifying the object 264 through a signal 908, the RFID readers 504, 508 and 512 acquires related information (object description, price, etc.) contained in the machine-readable identification tag 308 and wirelessly transmits the related information to the computer infrastructure 800 through a signal 912. The computer infrastructure 800 conducts a calculation according to the related information to obtain a calculation result, such as the total number and the total price of the objects in the shopping cart 120. The computer infrastructure 800 transmits the calculation result to the wireless communication device 608 and/or wireless communication device 612 through a signal 916. The wireless communication device 608 and/or wireless communication device 612 wirelessly transmits the calculation result to the shopping cart matching device 130 through a signal 920.

Figure 5:
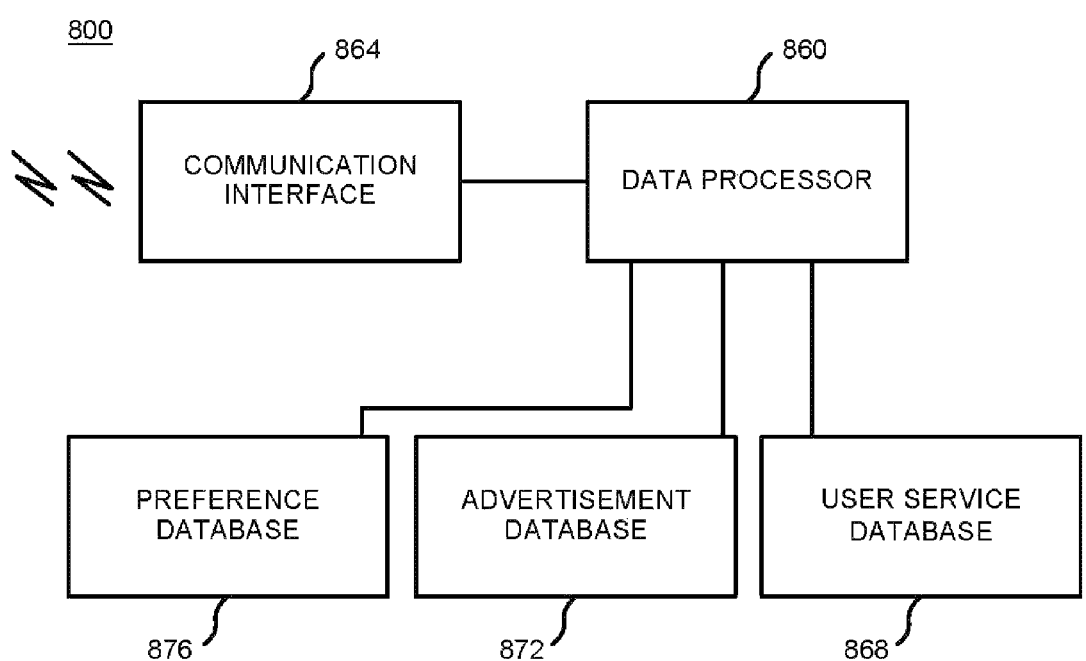
FIG. 5 is a block diagram illustrating a computer infrastructure for providing shopping, checkout, advertisement and personal user services of the embodiment.

FIG. 5 is a block diagram illustrating the computer infrastructure 800 providing checkout, advertisement and personal user services according to a specific embodiment. The computer infrastructure 800 comprises a data processor 860, a communication interface 864, a user service database 868, an advertisement database 872 and a preference database 876. The computer infrastructure 800 may be coupled and operated with the shopping cart matching device 130 and a user card 616 and a mobile device 716 (refer to FIG. 2).

Figure 6:
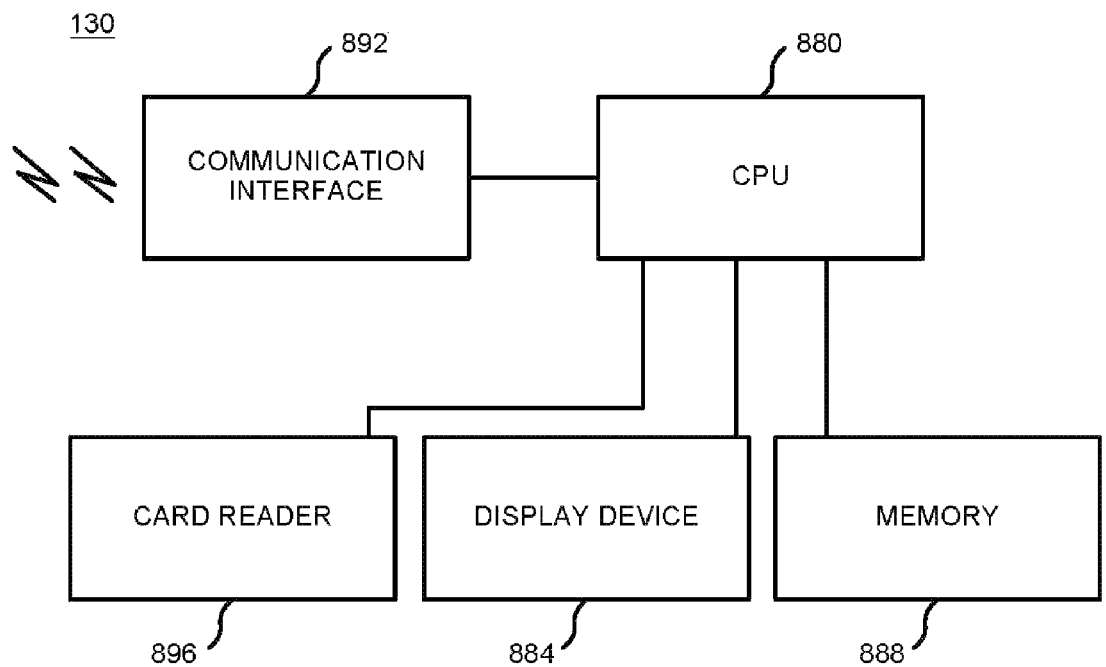
FIG. 6 is a block diagram illustrating a shopping cart matching device of the embodiment.

FIG. 6 is a block diagram illustrating the shopping cart matching device 130 according to a specific embodiment. The shopping cart matching device 130, which may be arranged on the shopping cart 120 used by a shopping user, comprises a CPU (central processing unit) 880, a display device 884, a memory 888, a communication interface 892 and a card reader 896 which are coupled with each other to operate together. The communication interface 892 is set to communicate using a wireless local area network, infrared ray, a wired local area network, a Bluetooth communication technology or the combinations thereof. The card reader 896 is a conventional card reader which corresponds to the type of the memory 620. For example, if the memory 620 of the card 616 is a semiconductor wafer, then the card reader 896 is an intelligent card reader which reads the wafer inserted therein. For example, if the memory 620 of the card 616 is an RFID tag, then the card reader 896 is an RFID tag reader for wirelessly scanning a radio electric signal from the RFID tag. All the memory units and card reader are well-known technologies in the field. For example, if the memory 620 is an RFID tag, then the preference information/history pre-stored in the RFID tag of the card 616 by the user can be updated by wirelessly rewriting the information stored in the RFID tag using a well-known RFID tag technology when the preference/history of the user is changed.

Refer to FIG. 2 again, the system 200 may selectively comprise at least one user-carried mobile device 716 such as a telephone, a personal digital assistant, a tablet PC and a notebook computer. It may be set that the communication interface 892 of the matching device 130 wirelessly communicates with the mobile device 716 of the user using a well-known communication technology such as a wireless local area network, Bluetooth or infrared ray communication technology, and that the communication interface 864 of the computer infrastructure 800 wirelessly communicates with the mobile device 716 of the user using a well-known communication technology such as a wireless local area network, Bluetooth or infrared ray communication technology. In order to apply the present invention, the mobile device 716 may be loaded in an application program which requests for and stores the preferences of the owner, such as the name, brand, store or color of a preferred object.

The infrastructure 800, the user card 616, the mobile device 716, the shopping cart matching device 130, the RFID readers 504, 508 and 512, the machine-readable identification tags 150 and 180 of the shopping cart and the machine-readable identification tags 304, 308, 312 and 316 of the objects can wirelessly communicate with each other, the hardware and/or software setting for achieving such a communication is well known in the field and is therefore not described herein repeatedly.

As shown in FIG. 1-FIG. 6, when a user takes the shopping cart 120 and shops with the shopping cart 120, the preference information stored in the memory 620 of the user card 616 carried by the user is read automatically (for example, when the memory 620 is a RFID tag) or is read by operating the card reader 896 (for example, inserting the card 616 into the card reader 896). The card reader 896 reads the preference information stored in the memory 620 of the card 616. If needed, the read preference information can be temporarily stored in a memory 888 and transmitted to the central processing unit 880, and then transmitted to the data processor 860 in order via the communication interfaces 892 and 864.

Once the preference information is collected, the data processor 860 selects a proper advertisement based on the preference information and displays the selected advertisement on the display device 884 of the matching device 130. In a specific embodiment, the shopping cart matching device 130 can be set to provide the catalogue of the user services provided by the computer infrastructure 800. If a required specific service is selected by the user from the catalogue, then the data processor 860 processes the requirement according to the preference information collected. The specific advertisement and/or personal user service information will continue to be transmitted to the shopping cart matching device 130 and displayed on the display device 884 of the shopping cart matching device 130 for the user to view.

The preference information of the user may be stored in a data center in advance and is acquired using a unique associated user ID. The unique user ID is stored in the memory 620 of the card 616. In a specific embodiment, the computer infrastructure 800 comprises a preference database 876 which is accessed by the data processor 860. The card reader 896 reads the user ID stored in the memory 620 of the card 616. The acquired user ID is sent to the CPU 880 and sequentially sent to the data processor 860 through wireless communication. The data processor 860 acquires related preference information from the preference database 876 or associates preference information with the user ID. Next, the data processor 860 processes the preference information to provide a specific advertisement and/or personal user service.

In a specific embodiment, the user of the card 616 logs in a website related to the marketplace 202 to generate a shopping list (for example, a list of objects the user inputs to purchase or a list generated by an intelligent home appliance according to an actual situation). The login and manual or automatic input of a shopping list can be achieved through an existing hardware and/or software setting. Then, the user enters the marketplace 220, and the information such as shopping list/shopping history/user preference in the card 616 is acquired by the card reader 896 through the aforementioned interaction between the card 616 and the card reader 896 and the aforementioned operation on the card 616 and the card reader 896.

In light of the description above, FIG. 7 shows another specific embodiment, which illustrates the flow 980 of the shopping and checkout of a user in the marketplace 220. First, the card reader 896 identifies the card 616 to read the user ID in the card 616 (ACT 982), and determines whether or not to acquire a shopping list/shopping history (ACT 984). If the determination result of ACT 984 is 'No', then the user is prompted to search the database 987 for desired objects (ACT 986). If the determination result of ACT 984 is 'Yes', then the information in the card 616 such as the shopping list/shopping history is transmitted to the shopping cart 120 (ACT 988), next, a recommended shopping route is generated (ACT 990) according to the shopping list/shopping history; the user selects objects and places the selected objects in the shopping cart 120, and calculates the total price of the objects purchased after selecting all desired objects (ACT 992); then, the user checks out and updates information to the computer infrastructure 800 (ACT 994).

In accordance with the present invention, the objects 260, 264, 268 and 272 in the marketplace 220 are all attached with machine-readable identification tags 304, 308, 312 and 316 so as to be read by, for example, high-frequency readers (RFID readers 504, 508 and 512); the number, the name, the price of and other related data of each object is established in the computer infrastructure 800 (e.g. computer server database); by means of the remote reading and positioning of the RFID readers and the wireless transmission of object data, the data of the machine-readable identification tag 308 is read by the RFID readers 504, 508 and 512 when the objects 264 selected by the user are placed in the shopping cart 120 and then sent to the computer infrastructure 800; and the data is subjected to a systemic processing and comparison operation and then transmitted to the display device 884 to display related information and other information of the selected object 264.

In the present invention, multiple objects can be intelligently managed in the same object zone, which reduces the wait-for-checkout time for the user, achieves an efficient stock management, and improves the quality of the services provided to the user in the object zone. It should be particularly noted that although the management on the object 264 in the shopping cart 120 in the marketplace 202 is exemplarily illustrated in the present invention, the storage unit is not limited to be a shopping cart, and other storage units such as goods shelf, counter, pallet, box, cage and storage unit having a proper storage space all fall within the scope of the present invention. Meanwhile, the object zone 202 may be areas of various forms, such as marketplace, shopping mall, store, supermarket, other shopping places or environments, or warehouse, freight station, other goods storage places or environments, which are not limited by the present invention.

Continue the description above, in the implementation and setting of hardware and/or software of the present invention, the computer infrastructure 800 provides various services for the user to enhance user's experience, for example, the computer infrastructure 800 provides a suggestion on the objects to be purchased based on user-related information, calculates the total price of the objects purchased, gives an indication to objects nearby or promotions, or recommends a shopping route; or in the case of an interactive stock management, the computer infrastructure 800 provides suggestions on real-time inventory replenishment (the system 200 automatically informs the warehouse manager to replenish stock when the type, number, listing or inventory level is lower than a certain limit) and deployment of stock positions.

The 'a specific embodiment', as used herein, or a similar expression presented in the specification refers to the inclusion of the specific feature, structure or characteristics described in combination with the specific embodiment in at least one specific embodiment. Therefore, the 'a specific embodiment', as used herein, or a similar expression may not necessarily refer to the same specific embodiment.

It should be understood by those skilled in the field that the present invention can be implemented as a system, a method or the computer-readable medium of a computer program product. Thus, the present invention can be embodied in a variety of forms, for example, the present invention can be completely embodied as hardware, completely embodied as software (hardware, resident software or micro-program code) or the combination of software and hardware, which will be hereinafter referred to as 'circuit', 'module' or 'system'. Further, the present invention may be further implemented as a computer program product in any visible medium form, in which computer-usable program codes are stored.

One or more combinations of computer-usable or computer-readable mediums are also applicable. For example, the computer-usable or computer-readable mediums may be (but are not limited to) electronic, magnetic, optical, electromagnetic, infrared or semi-conductive systems, apparatuses, devices or communication medium. More specifically, embodiments of the computer-readable medium include the following (but are not limited to) examples: an electrically connected portable computer disk consisting of one or more connecting lines, a hard disk drive, a random access memory (RAM), a read only memory (ROM), an erasable programmable read only memory (EPROM or flash memory), an optical fiber, a portable compact disc read-only memory (CD-ROM), an optical storage device, a communication medium (the basic connection of the Internet or intranet) or a magnetic storage device. It should be noted that the computer-usable or computer-readable medium may further be a paper or any proper medium on which a program can be printed to electronize the program again, for example, the paper or the medium may be optically scanned, compiled, decoded, interpreted or subjected to other necessary proper processing, and then stored in the memory of a computer again. In the present invention, the computer-usable or computer-readable medium may be any medium capable of remaining, storing, transmitting, broadcasting or transmitting program codes so that an instruction execution system, apparatus or device connected with the medium can process the program codes. The computer-usable medium may include a broadcasting data signal in which computer-usable program codes are stored in either baseband or partial carrier form. The transmission of the computer-usable program codes can be achieved using any proper medium which includes (but is not limited to) wireless, wired, optical cables and radio frequency (RF), etc.

The computer program codes for executing operations of the present invention may be written using one or more programming languages, which include object oriented programming language (Java, Smalltalk, C++ or the like) or traditional programming languages (e.g. C language or the like programming language). The program codes can be wholly or partially executed on the computer of the user in the form of an independent software suite, or partially executed on the computer of the user and partially executed on a remote computer.

The following related description is given with reference to the flowcharts and/or block diagrams of the information apparatus, method and computer program product according to embodiments described herein. It should be appreciated that each block in each flowchart and/or each block diagram and any combination of the blocks in the flowcharts and the block diagrams can be implemented using computer program instructions. The computer program instructions can be executed by a machine consisting of the processor of a general computer or a special computer or a machine consisting of another programmable data processor to realize the functions or operations illustrated in the flowcharts and/or block diagrams.

The computer program instructions may also be stored in the computer-readable medium to instruct the computer or another programmable data processor to realize a special function, and the instructions stored on the computer-readable medium may constitute a finished product containing instructions capable of realizing the functions or operations illustrated in the flowcharts and/or block diagrams.

The computer program instructions may be loaded to the computer or another programmable data processor so that the computer or another programmable data processor can conduct a series of operation actions, and the computer implementation procedure is generated when the instructions are executed on the computer or another programmable data processor so as to realize the functions or operations illustrated in the flowcharts and/or block diagrams.

The flowcharts and block diagrams of the architecture, function and operation applicable to the information apparatus, method and computer program product according to various embodiments of the present invention are shown in the drawings. Thus, each block in the flowcharts or block diagrams may represent a module, a sector or partial program codes, which contains one or more executable instructions for realizing specific logic functions. It should be noted that in some other embodiments, the functions described by the blocks may not be realized in accordance with the sequence shown in the drawings. For example, two connected blocks in the drawings may also be executed synchronously, or the functions involved in the blocks may also be executed in a sequence reverse to the sequence shown in the drawings. It should also be appreciated that the blocks in each block diagram and/or flowchart and the combinations thereof may be realized by a system based on hardware for special purposes, or specific functions or operations may be realized by the combination of hardware for special purposes and computer instructions.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed:

1. A system for managing multiple objects in an object zone, comprising:
    multiple machine-readable object identification tags configured to be respectively attached to the multiple objects;
    a storage unit moving through the object zone for storing one or more of the multiple objects within a predefined spatial range defining an area within the storage unit;
    at least one machine-readable storage unit identification tag configured to be attached to the storage unit and configured to define the predefined spatial range;
    multiple spaced reading units configured to remotely read the multiple machine-readable object identification tags and the at least one machine-readable storage unit identification tag; and
    at least one processor and memory configured to:
        determine that the one or more multiple objects are within the predefined spatial range based on the reading of the multiple-readable object identification tags and the at least one machine-readable storage unit identification tag; and
        associate the one or more multiple objects with the storage unit based on the determination.

2. The system according to claim 1, wherein
the at least one machine-readable storage unit identification tag is located at a substantially central point of the storage unit and is configured to define the predefined spatial range as a sphere having a certain radius, the sphere defining the area within the storage unit.

3. The system according to claim 1, further comprising:
at least two machine-readable storage unit identification tags which are located on the surface of the storage unit and are configured to define the area within the storage unit as the predefined spatial range.

4. The system according to claim 1, wherein
the storage unit can selectively be one of a shopping cart, a goods shelf, a counter, a pallet, a box, a cage and a storage unit having a proper storage space.

5. The system according to claim 1, wherein
the machine-readable object identification tag may selectively be one of a RFID tag, a zigbee tag and a NFC tag, or
the machine-readable storage unit identification tag may selectively be one of a RFID tag, a zigbee tag and a NFC tag.

6. The system according to claim 1, further comprising:
a computer infrastructure configured to provide an object management service for managing the multiple objects in the object zone;
a wireless communication device configured to enable the communication between the multiple machine-readable object identification tags, the at least one machine-readable storage unit identification tag, the multiple spaced reading units and the computer infrastructure; and
a storage unit matching device configured to acquire and display the object management service.

7. A storage unit applicable to an object zone in which there are multiple objects which are respectively attached with multiple machine-readable object identification tags, wherein the storage unit moves through the object zone, the storage unit comprises:
    a storage unit body for storing one or more of the multiple objects; and
    at least one machine-readable storage unit identification tag attached to the storage unit body and configured to define a predefined spatial range defining an area within the storage unit body, wherein
    one or more of the multiple objects are associated with the storage unit based on a determination the machine-readable object identification tags of the one or more multiple objects are within the predefine spatial range, the determination made by multiple spaced reading units in the object zone.

8. The storage unit according to claim 7, wherein
the at least one machine-readable storage unit identification tag is located at a substantially central point of the storage unit and is configured to define the predefined spatial range as a sphere having a certain radius, the sphere defining the area within the storage unit.

9. The storage unit according to claim 7, further comprising:
at least two machine-readable storage unit identification tags which are located on the surface of the storage unit and are configured to define the area within the storage unit as the predefined spatial range.

10. A method for managing multiple objects in an object zone, comprising:
    attaching multiple machine-readable object identification tags to the multiple objects respectively;
    attaching at least one machine-readable storage unit identification tag to a storage unit which moves through the object zone for storing one or more of the multiple objects, the at least one machine-readable storage unit identification tag configured to define a predefined spatial range defining an area within the storage unit;
    remotely reading the multiple machine-readable object identification tags and the at least one machine-readable storage unit identification tag using multiple spaced reading units;
    determining one or more of the multiple objects attached with the machine-readable object identification tags are within the predefined spatial range defined based on the reading of the multiple machine-readable object identification tags and the at least one machine-readable storage unit identification tag; and
    associating the one or more of the multiple objects with the storage unit based on the determination.

11. The method according to claim 10, wherein
the at least one machine-readable storage unit identification tag is located at a substantially central point of the storage unit and is configured to define the predefined spatial range as a sphere having a certain radius, the sphere defining the area within the storage unit.

12. The method according to claim 10, further comprising: attaching at least two machine-readable storage unit identification tags to the surface of the storage unit, the at least two machine-readable storage unit identification tags are configured to define the area within the storage unit as the predefined spatial range.

\* \* \* \* \*